United States Patent

Miserlis

[11] Patent Number: 6,117,207
[45] Date of Patent: Sep. 12, 2000

[54] PROCESS FOR RECOVERING METALS AND OTHER CHEMICAL COMPONENTS FROM SPENT CATALYSTS

[76] Inventor: Constantine Miserlis, 100 College Ave., Arlington, Mass. 02174

[21] Appl. No.: 09/112,914

[22] Filed: Jul. 9, 1998

Related U.S. Application Data

[60] Provisional application No. 60/084,456, May 6, 1998.

[51] Int. Cl.[7] .................................................. C22B 7/00
[52] U.S. Cl. ............................. 75/414; 95/233; 502/22
[58] Field of Search ........................... 75/414, 345, 353; 502/22; 95/233

[56] References Cited

U.S. PATENT DOCUMENTS

| | | | |
|---|---|---|---|
| 2,833,816 | 5/1958 | Saffer et al. | 562/416 |
| 3,966,886 | 6/1976 | Bakker et al. | 75/353 |
| 4,147,887 | 4/1979 | Yasukawa et al. | 13/18 |
| 4,247,311 | 1/1981 | Seibert et al. | 55/162 |
| 4,594,449 | 6/1986 | Takuma et al. | 562/416 |
| 4,827,486 | 5/1989 | Brotzmann et al. | 373/2 |
| 5,191,154 | 3/1993 | Nagel | 588/201 |
| 5,358,549 | 10/1994 | Nagel et al. | 75/414 |
| 5,413,621 | 5/1995 | Hogner et al. | 75/414 |
| 5,424,042 | 6/1995 | Mason et al. | 422/159 |
| 5,759,229 | 6/1998 | Feitler | 75/352 |

FOREIGN PATENT DOCUMENTS 0 529 243 A1  3/1993  European Pat. Off. .

*Primary Examiner*—Jill Warden
*Assistant Examiner*—Tima McGuthry-Banks
*Attorney, Agent, or Firm*—Nields, Lemack & Dingman; Brian M. Dingman

[57] ABSTRACT

A process for recovering metal from spent catalyst, containing at least a metal component, comprising providing a heated, liquid metal bath, at a temperature sufficient to melt the metal in the spent catalyst, and create off gas from any volatile non-metal catalyst components, adding spent catalyst to the bath, collecting off gas from the bath, transporting the collected off gas to a gas cooler, and maintaining the off gas during the transportation at a temperature of at least about 875° F.; rapidly cooling the off gas to less than about 275° F. in no more than about 0.15 seconds, to prevent the formation of dioxin; and withdrawing melted metal from the bath, for reuse as catalyst.

15 Claims, 2 Drawing Sheets

PROCESS FOR RECOVERING METALS AND OTHER CHEMICAL COMPONENTS FROM SPENT CATALYSTS

CROSS REFERENCE TO RELATED APPLICATION

This application is a continuation in part of copending Provisional Application 60/084,456, filed on May 6, 1998.

FIELD OF THE INVENTION

This invention relates to a process for recovering valuable metals and chemical components from spent catalysts.

BACKGROUND OF THE INVENTION

Metal-containing catalysts are used in a large number of processes in the manufacturing and processing of thousands of tons per day of industrial chemicals, chemical intermediates, automotive exhausts, plastics and petroleum products to name a few. Such catalysts typically contain a majority of one or more valuable and expensive metals including such metals as platinum, vanadium, palladium, silver, copper, cobalt, manganese, nickel and molybdenum. Such catalysts may contain one or more of these and other metals in pure form or as compounds such as oxides, hydrogenated and organic metal compounds, with or without halides, or inorganic residues such as silica, alumina, calcium, magnesium, or sulfur.

As is well know, over time in use, such catalysts become spent, primarily from poisoning. In processes using such catalysts, it is necessary to periodically replenish the catalyst. There is great need for recovery of the metals fraction of spent catalyst, both in terms of cost savings and also for conservation of such metals. However, to date, such catalysts metal recovery processes are inefficient and expensive, indeed if they are in use at all.

Currently, two methods are primarily used for handling of cobalt/manganese metal and hydrogen bromide from waste catalyst streams from PTA/DMT manufacturing plants. When the waste is incinerated, only about 80% of the cobalt is recovered, the bromine is lost and the processing cost is very high. Also, the vent gas is heavily laden with dioxins which are extremely dangerous to the environment. Settling ponds can be used to treat the catalyst waste stream, but are disfavored or outlawed due to the potential for pollution. Other methods such as ion exchange processes, or distillation and extraction processes, have been used unsuccessfully for handling catalyst waste streams from PTA/DMT manufacturing plants.

SUMMARY OF THE INVENTION

It is therefore a primary object of this invention to provide a process for recovering at least metals, and potentially other valuable components, from spent catalysts.

It is a further object of this invention to provide such a process which recovers virtually all of the valuable metals in spent catalysts.

It is a further object of this invention to provide such a process which also creates a fuel supplement gas.

It is a further object of this invention to provide such a process which inhibits or does away with the creation of dioxins.

It is a further object of this invention to provide such a process which recovers the cobalt/manganese metal used in the catalyst for the production of purity terephthalic acid (PTA) and dimethyl terepthatic acid (DMT), which themselves are used in the production of PET plastic.

It is a further object of this invention to provide such a process which also recovers the bulk of the bromine contained in the waste catalyst.

It is a further object of this invention to recover platinum from spent platinum catalyst streams taken from nitric acid manufacturing plants.

It is a further object of this invention to provide such a process which recovers platinum or vanadium from spent platinum or vanadium pentoxide catalyst streams taken from sulfuric acid manufacturing plants.

It is a further object of this invention to provide such a process which recovers vanadium or silver from spent vanadium pentoxide or silver catalyst streams taken from maleic anhydride manufacturing plants, phthalic anhydride manufacturing plants, or epoxide manufacturing plants.

It is a further object of this invention to provide such a process for recovering platinum or palladium from spent catalyst stream taken from petroleum reforming operations.

It is a further object of this invention to provide such a process for recovering cobalt/molybdenum or nickel from spent catalyst streams taken from petroleum hydro processing plants or triglyceride hydrogenation operations.

It is a further object of this invention to provide such a process for recovering platinum, palladium or rhenium from spent catalyst streams taken from automotive exhaust catalytic converters.

It is a further object of this invention to provide such a process for recovering copper oxide from the ammoxidation of propylene to acrylonitrile process.

This invention features in one embodiment a process for recovering metal from spent catalyst, containing at least a metal component. The process contemplates providing a heated, liquid metal bath, at a temperature sufficient to melt the metal in the spent catalyst, and create off gas from any non-metal catalyst components, adding spent catalyst to the bath, and collecting off gas from the bath. The collected off gas is transported to a gas cooler, and maintained during the transportation at a temperature of at least about 875° F. At least most of the off gas is rapidly cooled in the gas cooler to less than about 275° F. in no more than about 0.15 seconds, to prevent the formation of dioxin. Also, melted metal is withdrawn from the bath, for reuse as catalyst. Catalysts containing metals which can be processed according to this invention are partially listed in the *Kirk Othmer Concise Encyclopedia of Chemical Technology,* John Wiley Interscience Publication, 1985 abridged version, third edition, pages 224–226, 443, 786, 856, 857, 885, and 1136.

In a preferred embodiment, an electric arc furnace, and more preferably a hollow core electrode, D.C. or A.C. arc furnace, is used to melt the spent catalyst feed and maintain the heated liquid metal bath. Such furnaces are commonly used in melting and refining operations for steel and iron manufacturing. With a hollow core electrode furnace, the feed is preferably added through the hollow core of the hollow core electrode. Such furnace is preferably operated at a temperature of at least about 2800° F. The interior of the furnace is preferably maintained as a reducing atmosphere, with essentially zero percent oxygen in the off gas. This is one step towards preventing the formation of dioxins in the off gas.

When processing catalysts which include non-volatile inorganics such as insoluble metal salts (e.g. copper oxide), silica, alumina, calcium, magnesium, or sulfate salts, an insoluble slag phase floats on top of the liquid metal bath. This would be separately decanted from the furnace as needed. This slag phase is not substantial in processing of waste catalyst from PTA/DMT manufacturing.

The off gas should be maintained at a temperature of at least 875° F. until it is rapidly cooled in less than about 0.15 seconds (preferably in about 0.05 seconds) to less than about 275° F. This rapid cooling in the above temperature range and within the above time entirely prevents the dioxin reaction, resulting in an off gas which is dioxin-free.

The cooled off gas is preferably scrubbed with a liquid such as water to solubilize components. When the off gas includes hydrogen bromide, the scrubbing liquid is hydrobromic acid, with makeup water being supplied to the scrubber, and hydrobromic acid of a desired concentration being continuously withdrawn therefrom, for use in the PTA/DMT process.

The off gas is preferably cooled in a fluid bed cooler which includes internal dust filtration, and recycle of the filtered dust to the heated bath. The bed preferably is initially charged with particles of catalyst constituents, such as a metal and/or carbon.

The cooled, scrubbed off gas maybe passed through a desiccant bed to dehydrate the off gas, and may also then be passed through a tail gas polishing filter to neutralize any traces of acid present in the tail gas stream. The resulting off-gas, if it contains hydrogen and/or carbon monoxide, has a high heating value, and thus, can be used as a fuel gas.

BRIEF DESCRIPTION OF THE DRAWINGS

Other objects, features and advantages will occur to those skilled in the art from the following description of the preferred embodiment, and the accompanying drawings, which.

DESCRIPTION OF THE PREFERRED EMBODIMENT

This invention maybe accomplished in a process for recovering metal from spent catalyst containing one or more metals, and potentially containing non-metal components. The process is applicable for any such catalyst, but will be described herein for a recovery of cobalt and manganese from the brominated acetate, organic cobalt manganese catalyst used in the production of PTA and DMT. Most basically, the process contemplates providing a heated, liquid metal bath at a temperature sufficient to melt the metal in the spent catalyst, and to create off-gas from any volatile non-metal components. The bath is initially charged with the metal or metals in the catalyst The spent catalyst is added to the bath. The off-gas is collected from the bath. The collected off-gas is transported to a gas cooling device, such as a fluid bed cooler. Between the bath and the cooler, the off-gas is preferably maintained at a temperature of at least about 875° F. The off-gas is then preferably rapidly cooled in the gas cooler to less than about 275° F. in no more than about 0.15 seconds, to prevent the formation of dioxin in the off-gas. As needed, melted metal is withdrawn from the bath, for reuse as catalyst, or in the production of catalysts.

Figure 1:
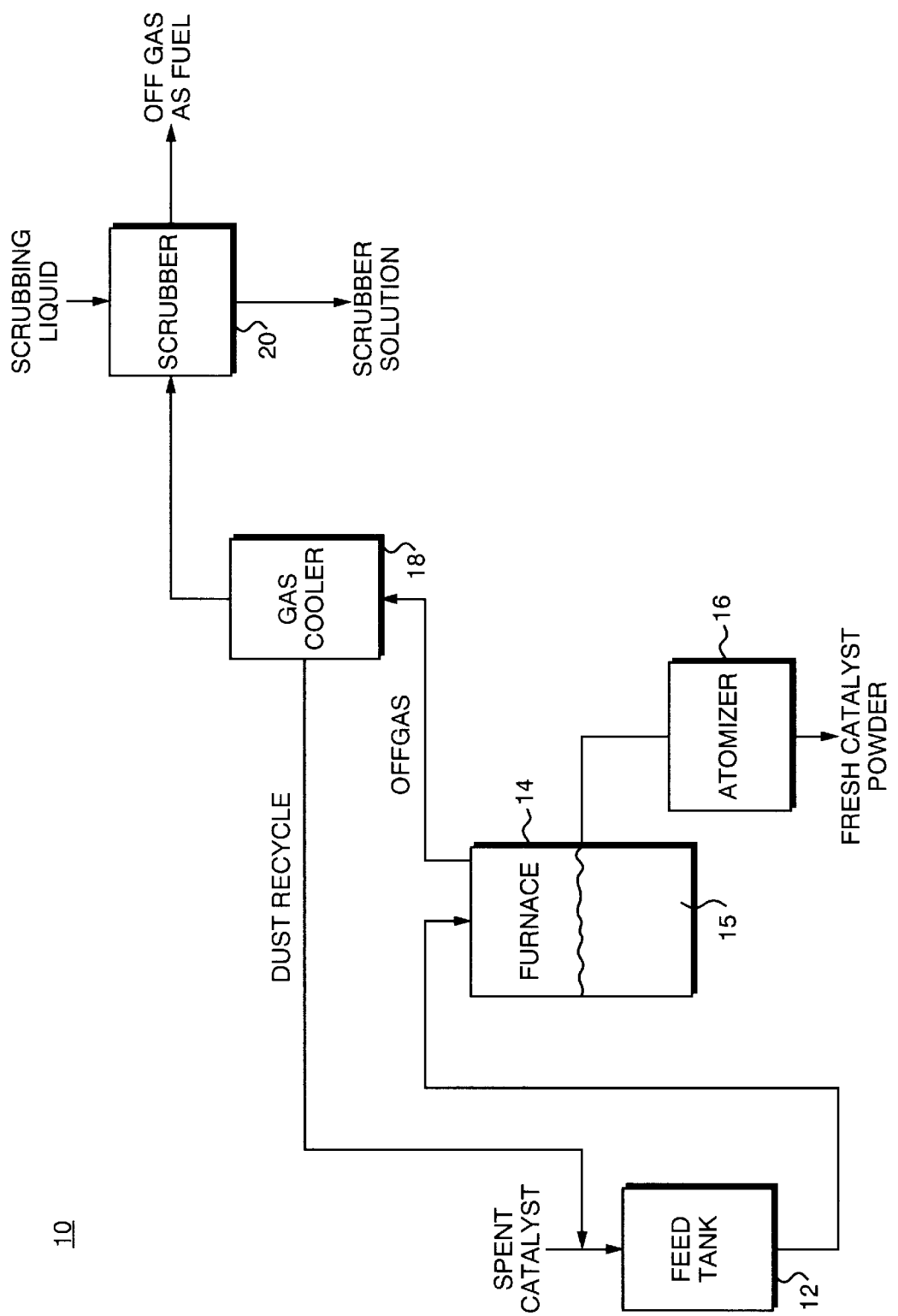
FIG. 1 is a simplified, schematic diagram of a process according to this invention.

The basic process is shown as process 10, FIG. 1. Spent catalyst is held in feed tank 12, which feeds furnace 14 holding liquid metal bath 15. The metal in the catalyst melts and becomes part of bath 15. Periodically or continuously, liquid metal is removed from bath 15 and atomized by atomizer 16, to create a catalyst metal powder which can be used as a catalyst or in the catalyst manufacturing process.

The off-gas from furnace 14 is cooled in gas cooler 18, and soluble components are largely removed in scrubber 20. The outputs of scrubber 20 include a scrubber solution which can be used as desired, and an off-gas which can be used as fuel, presuming it has a fuel value.

Figure 2:
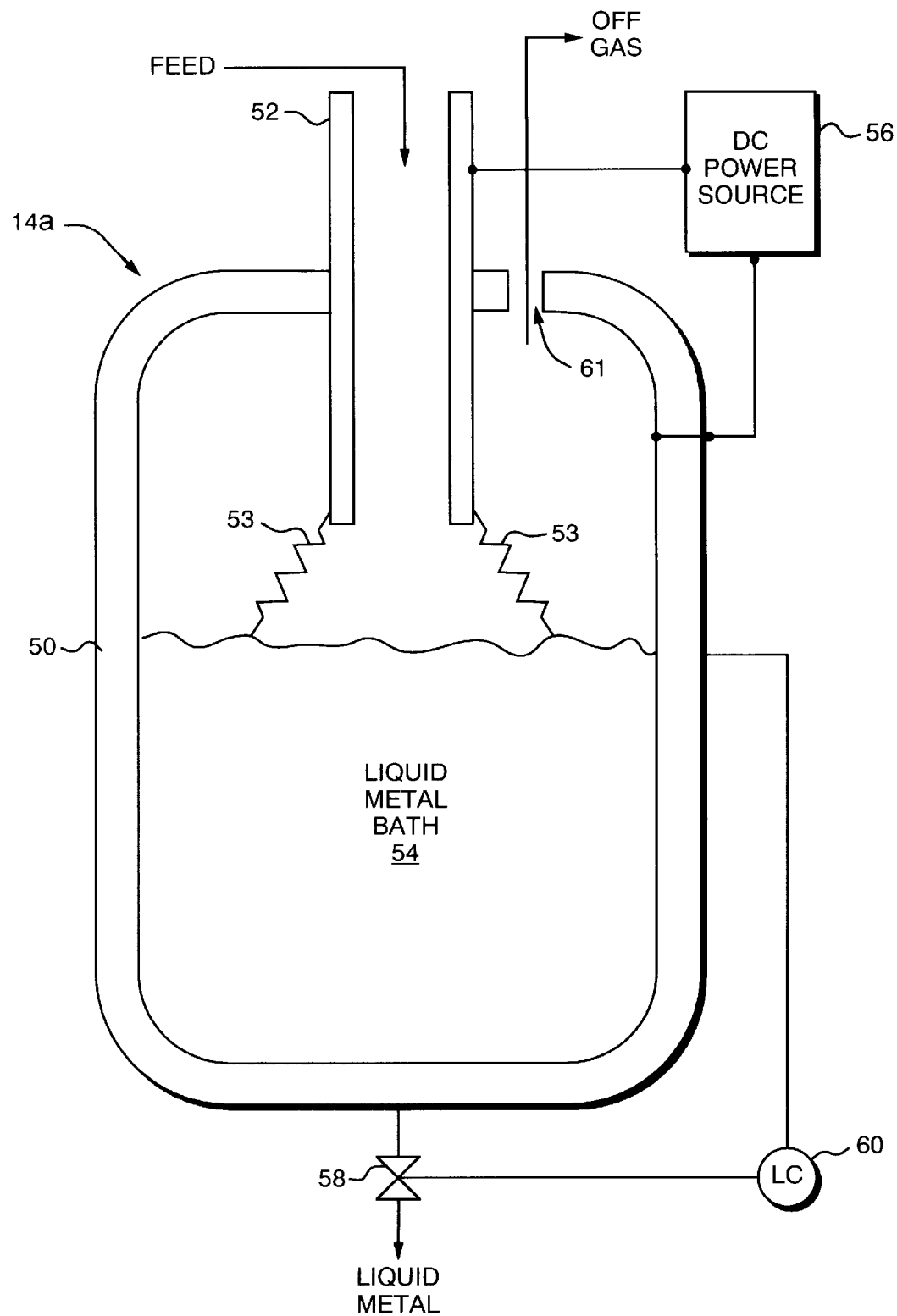
FIG. 2 is a more detailed schematic, cross-sectional diagram of a preferred hollow core electrode, direct arc furnace used in the process of FIG. 1.

In the preferred embodiment of this invention, hollow core electrode D.C. or A.C. electric arc type furnace 14a, FIG. 2, is used as the furnace in the process. Furnace 14a includes hollow graphite electrode 52. Electric arc 53 is maintained between electrode 52 and liquid metal bath 54, through use of power supply 56. In this furnace, bath 54 is heated both by radiation and the conduction of the current passing through the bath. In electric arc 53 itself, which exists in the space between the bottom tip of electrode 52 and the top of bath 54, a plasma is formed at a temperature in the range of about 10,000° F. The spent catalyst falls through the plasma on its way into bath 54. Due to the extremely high temperature, all of the constituents of the feed are reduced to their elemental form. The metal component enters bath 54, which can be regulated to a desired temperature of about 2500° to 3000° F. by adjusting power supply 56. Hydrocarbons and other volatile portions of the feed react with all of the oxygen in the feed to form carbon monoxide and hydrogen, which leaves the furnace through outlet nozzle 61. Due to the fact that there is an insufficient amount of oxygen present in the spent catalyst, a stoichiometric amount of oxygen can be added with the feed to fully convert all of the carbon in the feed to carbon monoxide, such that there is maintained a reducing atmosphere within furnace 14. The off-gas thus includes carbon monoxide, hydrogen, carbon dust, hydrogen bromide gas, and a small amount of entrained cobalt and manganese metal. If there are any halogens present in the spent catalyst, such as bromine, chlorine or fluorine, such are rapidly converted into the hydrogen halides hydrogen bromide, hydrogen chloride, or hydrogen fluoride, which also exit with the offgas stream leaving the top of the furnace.

In the preferred embodiment in which the spent catalyst is from the PTA or DMT manufacturing process, the spent catalyst is prepared first by dehydrating it to remove water. Generally, such dehydrated spent catalyst held in feed tank 12 is about 1 to 4 weight percent cobalt, 2 to 8 weight percent manganese, 60 to 75 weight percent hydrocarbons, 2 to 10 weight percent bromine, and 15 to 30 weight percent oxygen. The exact chemical composition of the dehydrated catalyst purge stream from any specific plant is very constant. However, such compositions vary from plant to plant, in the range of about plus or minus 25 weight percent.

The furnace 14a may initially be charged with cobalt metal powder. The dehydrated liquid purge stream is pumped from feed tank 12 into reactor 14a, without any additives or fuel oil, and with a stoichiometric amount of oxygen as described above. When the liquid metal bath reaches a high level, under control of level control 60, drain valve 58 is opened and liquid metal is provided to atomizer 16. All of the remaining constituents in the feed are converted into hydrogen, carbon monoxide, and hydrogen bromide gas. The off-gas is typically at a temperature of about 2800° F. The temperature of the off-gas is maintained at at least about 875° F., and preferably in the range of 2200° to 2500° F., until it is cooled in gas cooler 18. This can be accomplished with insulated pipes and a proper gas velocity.

Gas cooler 18 is preferably a fluid bed cooler in which cooling water is used in the cooling coils. The fluidized bed cooler, with immersed cooling coils in the fluidized bed, cools the feed gas from the entering temperature of about 2000° F. or more, to approximately 200° F., in about 0.05 seconds, which is sufficient to prevent the formation of any dioxins in the off-gas. The fluid bed cooler preferably includes dust filters to prevent dust contained in the reactor effluent gas from leaving the fluid bed cooler. Filtered dust is then automatically withdrawn and recycled back to feed tank 12, where it is blended and mixed with the fresh feed and then recycled back to the furnace, or it may be separately removed for metal catalyst recovery. The fluid bed may be initially charged with cobalt metal and carbon particles of about 100 to 300 microns particle size. The initial fluid bed charge of cobalt and carbon particles prevents cooling coil fouling by scouring the surface of the immersed cooling coils. This maintains a good overall heat transfer coefficient in the bed. Build up of dust in the bed can be automatically recycled to the furnace feed tank, or separately withdrawn for recovery of the cobalt/manganese values.

Due to the high temperature and reducing atmosphere in furnace 14*a*, it is impossible for water to be present in the off-gas (any water decomposes into hydrogen and oxygen). The off gas, even though it contains hydrogen bromide, is non-corrosive as long as the gas temperature is above the dew point of water and hydrogen bromide. Thus, all of the off-gas piping from the outlet of the furnace to the inlet of scrubber 20 can be made of carbon steel. The distribution grid of the fluid bed cooler is designed with suitable openings and cross-sectional freeflow area to provide the required velocity and pressure drop necessary for good fluidization. It is preferably constructed of high nickel alloy materials.

Scrubber 20 is initially charged with 15 to 20 weight percent hydrobromic acid. Scrubber 20 must be made of a material of suitable quality for hydrobromic acid service, such as solid FRP, or plastic lined steel. Virtually all of the hydrogen bromide in the off-gas stream is absorbed in the scrubber fluid, in which makeup water is provided to maintain the acid concentration at the desired level, under automatic control. The recovered hydrobromic acid can be recycled to the PTA/DMT manufacturing plant for reuse. Although not shown in the drawings, scrubber 20 preferably includes a pump around loop with cooling to maintain the temperature at about 110° F., so that the temperature of the tailgas leaving scrubber 20 is low. By maintaining the temperature of the tailgas leaving the scrubber at below 120° F., the concentration of free HBr in the tailgas stream is less than 100 ppm, and the moisture content is minimal.

This tailgas may then be passed through a silica gel desiccant bed drier to reduce the moisture content such that its dew point is less than −20° F. The last traces of HBr present in the tailgas may then be neutralized in a polishing filter of calcium hydroxide pellets.

The metal removed from the furnace is preferably formed into a powder using an atomizer such as an atomized granulator system available from Atomized Systems Limited, Sheffield, England. This atomizer uses a jet of high pressure water to atomize liquid metal which is introduced through the top port of the atomizing vessel. The resulting powder may then be made ready for reuse as a catalyst component.

Alternatives to the hollow core electric arc furnace include: a solid electrode arc furnace (potential problems include the fact that much of the feed will bypass the plasma, and thus not be heated to decomposition, thus allowing molecular hydrocarbon fragments to be present in the off gas); a simple retort or crucible or other type of standard furnace (potential problems include efficiency, and the fact that the off gas contains the products of combustion of the feed volatile components and air, with a high concentration of nitrogen or uncombusted feed. This is typically an oxidizing process, and thus will not produce a fuel gas, or the metal in the desired form); and a liquid metal bath with feed introduced below the bath (potential problems include feed nozzle clogging and problems resulting therefrom, such as liquid metal breakout).

Alternatives to the fluid bed to rapidly cool the off gas include: a water quench (potential problems include formation of corrosive acids, which requires use of expensive inert metal reactor walls); cold gas stream quench and downstream shell and tube gas cooler (potential problems include expense, rapid fouling of heat transfer surfaces, and potential inability to cool the off gas to less than 200° F.; and a shell and tube cooler, or a karbate cooler, using refrigerant cooling fluid (potential problems include heat transfer surface fouling and insufficient cooling). All of these will also suffer from the difficulty of removing entrained particulates, and inability to prevent dioxin formation.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A process for recovering metal from spent catalyst which includes cobalt and manganese, comprising:

providing a hollow core electrode electric arc furnace holding a heated, liquid metal bath, at a temperature sufficient to melt the metal in the spent catalyst, and create an off gas from volatile non-metal components of the catalyst, said off gas including hydrogen bromide;

adding spent catalyst to said bath through said hollow core electrode;

collecting off gas from said bath, and maintaining low oxygen content in said off gas;

transporting said collected off gas to a fluid bed gas cooler, and maintaining said off gas during the transporting step at a temperature of at least about 2000° F.;

rapidly cooling at least most of said off gas in the gas cooler to less than about 200° F. in no more than about 0.05 seconds, to prevent the formation of dioxin in the off gas;

after the gas is cooled, scrubbing the cooled off gas with hydrobromic acid, to solubilize the hydrogen bromide in said off gas; and withdrawing melted cobalt and manganese metal from the bath, for reuse in the production of catalyst.

2. A process for recovering metal from spent catalyst containing at least a metal component comprising:

providing a heated, liquid metal bath, at a temperature sufficient to melt the metal in the spent catalyst, and create off gas from volatile non-metal components of the catalyst;

adding spent catalyst to the bath;

collecting off gas from the bath;

withdrawing melted metal from the bath, for reuse as catalyst, or in the production of catalyst;

transporting said collected off gas to a fluid bed gas cooler, and maintaining said off gas during the transporting to said gas cooler at a temperature of at least about 875° F.;

rapidly cooling at least most of said off gas in said gas cooler to less than about 275° F. in no more than about 0.05 seconds, to prevent the formation of dioxin in the off gas; and after the off gas is cooled, scrubbing the cooled off gas with a liquid to solubilize liquid-soluble components of the off gas, wherein the off gas includes hydrogen bromide, and in which the scrubbing liquid is hydrobromic acid.

3. The process of claim 2 in which providing a heated, liquid metal bath includes providing an electric arc furnace.

4. The process of claim 3 in which said electric arc furnace is a hollow core electrode electric arc furnace.

5. The process of claim 4 in which adding spent catalyst to both bath includes feeding spent catalyst into said furnace through said hollow core.

6. The process of claim 5 in which providing a heated, liquid metal bath further includes operating said furnace to maintain said liquid metal bath at a temperature of at least 2800° F.

7. The process of claim 2 further including maintaining essentially zero percent oxygen in said off gas.

8. The process of claim 2 further including filtering dust in said off gas in said fluid bed cooler.

9. The process of claim 8 further including removing said filtered dust for metal recovery.

10. The process of claim 2 further including passing said cooler, scrubbed off gas through a desiccant bed, to dehydrate said off gas.

11. The process of claim 2 further including atomizing said withdrawn melted metal, to create a metal powder for reuse in a catalyst.

12. The process of claim 2 in which said spent catalyst includes cobalt.

13. The process of claim 12 in which said spent catalyst further includes maganese.

14. The process of claim 2 in which, during said transporting step, said off gas is maintained at a temperature of at least 2200° F.

15. The process of claim 14 in which, during said rapidly cooling step, said off gas is cooled to less than 200° F. in no more than about 0.05 seconds.

* * * * *